(12) United States Patent
Bungenstock

(10) Patent No.: US 8,956,026 B2
(45) Date of Patent: Feb. 17, 2015

(54) LIGHT GUIDES FOR VEHICLES

(71) Applicant: Hella KGaA Hueck & Co., Lippstadt (DE)

(72) Inventor: Carmen Bungenstock, Kleinenberg (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 14/029,591

(22) Filed: Sep. 17, 2013

(65) Prior Publication Data

US 2014/0078765 A1   Mar. 20, 2014

(30) Foreign Application Priority Data

Sep. 20, 2012   (DE) .......................... 10 2012 108 855

(51) Int. Cl.
*G02B 6/26* (2006.01)
*B60Q 1/00* (2006.01)
*F21V 8/00* (2006.01)
*F21S 8/10* (2006.01)

(52) U.S. Cl.
CPC ................ *G02B 6/26* (2013.01); *B60Q 1/0011* (2013.01); *G02B 6/0006* (2013.01); *G02B 6/002* (2013.01); *F21S 48/215* (2013.01); *F21S 48/2237* (2013.01); *F21S 48/2268* (2013.01); *F21S 48/2287* (2013.01); *G02B 6/0038* (2013.01)
USPC ........................................................ 362/511

(58) Field of Classification Search
CPC ........... F21Y 2101/02; F21Y 2113/005; F21S 48/1241; F21S 48/2237; B60Q 1/52; B60Q 3/005
USPC .............................................. 362/511, 249.02
See application file for complete search history.

(56) References Cited

U.S. PATENT DOCUMENTS

| | | | |
|---|---|---|---|
| 2006/0062016 A1 | 3/2006 | Dejima et al. | |
| 2008/0002429 A1 | 1/2008 | Noba | |
| 2009/0135621 A1* | 5/2009 | Muegge | 362/516 |
| 2014/0078772 A1* | 3/2014 | Gaydoul et al. | 362/555 |

FOREIGN PATENT DOCUMENTS

| | | |
|---|---|---|
| DE | 102007057399 A1 | 5/2009 |
| DE | 102008056985 A1 | 5/2010 |
| DE | 102010044424 A1 | 3/2012 |
| FR | 2887997 A1 | 1/2007 |
| JP | 2007227095 A | 9/2007 |

* cited by examiner

*Primary Examiner* — Tracie Y Green
(74) *Attorney, Agent, or Firm* — Husch Blackwell LLP

(57) ABSTRACT

A light guide for vehicles includes a light coupling section for the coupling of light into a first end and/or a second end of the light guide, with a main section having a front side for the coupling out of light and a back extending between the first end and the second end of the light guide and comprising elements for coupling-out for the deflection of the coupled-in light toward the front side, wherein the section for the coupling-in of light is embodied as a defocusing element situated between a surface coupling the light in and the main section.

10 Claims, 2 Drawing Sheets

LIGHT GUIDES FOR VEHICLES

CROSS REFERENCE

This application claims priority to German Patent Application No. 10 2012 108855.1, filed Sep. 20, 2012.

TECHNICAL FIELD OF THE INVENTION

The invention relates to a light guide for vehicles with a light coupling section for the coupling of light into a first end and/or a second end of the light guide, with a main section having a front side for the coupling out of light and a back extending between the first end and the second end of the light guide and comprising elements for coupling out for the deflection of the coupled-in light toward the front side.

BACKGROUND OF THE INVENTION

From DE 10 2006 038 759 A1, a light guide for vehicles is known, having a light coupling section for the coupling of light into a light guide and a main section for the distribution and coupling-out of the light along an extension direction of the light guide. On one hand, the main section has a front side, on which the coupled-in light is coupled out into the environment. On the other hand, the main section has a back with decoupling elements, on which the coupled-in light is diverted into the direction of the front side. The section for the coupling-in of light is shaped so that the coupled-in light converges within the main section to form a focal line. By this means, a more homogeneous illumination of the light guide is achieved in comparison with the ellipsoidal contour of the section for the coupling-in of light known from DE 199 24 411 A1, or resp. with an embodiment of the section for the coupling-in of light in shape of a lens known from DE 10 2009 054 543 A1. However, a focusing of the coupled-in light, namely in the focal line, does also occur, so that undesirable brightness maxima occur within the main section of the light guide.

Therefore, it is the task of the present invention to further develop a light guide for vehicles so that an improved homogeneous illumination of the light guide is achieved.

SUMMARY OF THE INVENTION

For the solution of this task, the invention in connection with the preamble of patent claim 1 is characterized in that the section for the coupling-in of light is embodied as a defocusing element extending between a surface coupling the light in and the main section.

The particular advantage of the invention is, that high luminance values are avoided in the section for the coupling-in of light, so that a homogeneous lighting of the main section of the light guide can be achieved. This is achieved without significantly influencing a radiation characteristic of the light guide in the main section. Also, the defocusing element according to the invention allows a swirling and spatial mixing of the light beams even before the light reaches the main section of the light guide, without photometric or efficiency losses being noted. Large brightness maxima are avoided in the main section as well as in the section for the coupling-in of light. In particular, the invention does also allow the use of RGB-light diodes as a light source, wherein the colors red, green and blue are optimally mixed for the generation of white light in the section for the coupling-in of light. Furthermore, the defocusing element can be formed with relatively little manufacturing cost and effort.

According to a preferred embodiment of the invention, the defocusing element comprises a widened part connecting to the surface coupling the light in, and a straight part extending between the widened part and the main section. Advantageously, an undesirable focusing of the light beams is avoided here, the straight part of the defocusing element serving the guiding and provision of the light for the main section. In the defocusing element embodied by this means, the coupled-in light receives the opportunity to spread further into the available space and to mix, so that it can meet the element for coupling-out element of the main section with a uniform luminance. The widened part can for example be embodied by means of a free form contour or a conical contour. By these means, the focusing of the light beams is avoided.

According to a preferred embodiment of the invention, the defocusing element has a defocusing, i.e. light dispersive outer surface which achieves an improved swirling and spatial mixing of the light beams.

If the light guide has a rod-shaped embodiment, high luminance values in the section for the coupling-in of light or in the main section can be avoided by the use of a conical widened part and a cylindrical straight part.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
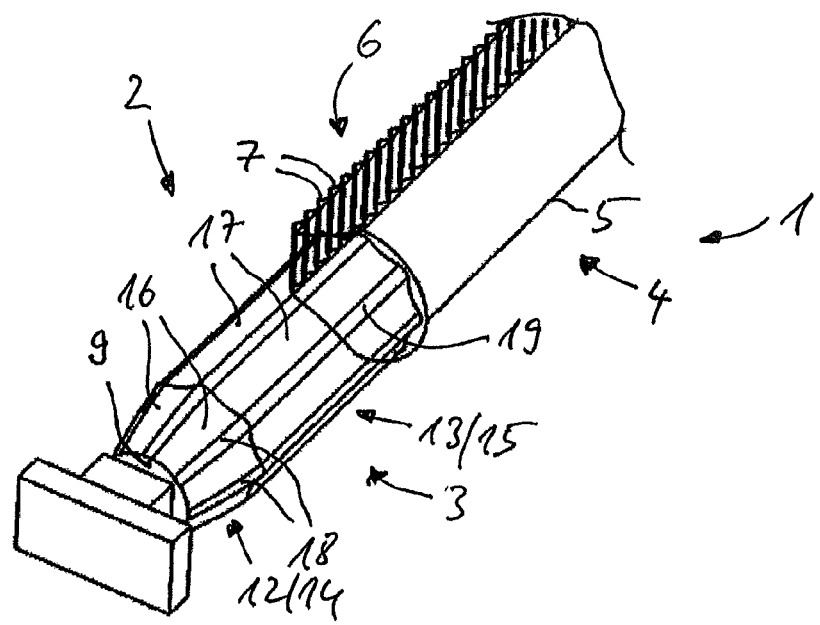
FIG. 1 A perspective view of a light guide on a first end of the same.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A light guide according to the invention can be used as signal lamp for vehicles in the rear or front area, for example as daytime running light or marker light. Alternatively, the light guide according to the invention can also be used for the lighting of operating elements or the contour illumination of doors or instrument packs in the passenger compartment.

The light guide according to the invention can be embodied two-dimensionally or as a rod. The two-dimensional light guide allows a large-area light radiation, herein the two-dimensional light guide may be shaped according to the contour of, for example, the interior trim of the motor vehicle.

In the following, a rod-shaped light guide 1 is described by means of the drawings, essentially having a section for the coupling-in of light 3 on a first end 2 and/or on an end on the opposite side not being represented, and a main section 4, which follows the section for the coupling-in of light 3.

The main section 4 extends between the first end 2 and the second end. The main section 4 has a front side 5 for the coupling-out of the light L1 coupled in via the section for the coupling-in of light 3. Furthermore, the main section 4 has, on the side opposing the front side 5, a back 6 having a multitude of prism-shaped elements for coupling-out of light 7 for the diversion of the coupled-in light L1 into the direction of the front side 5 coupling-out the light.

Figure 2:
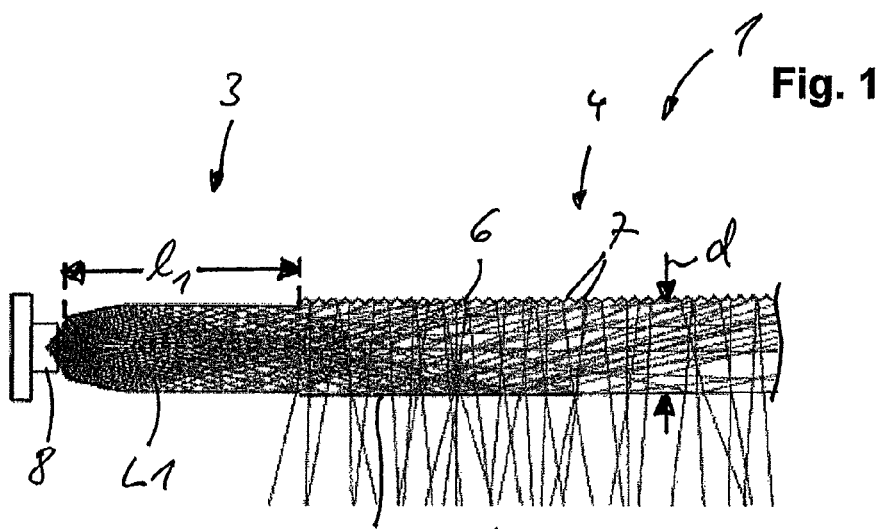
FIG. 2 A partial horizontal section through the light guide according to the invention with indicated light beam path, FIG. 3 A partial horizontal section through a known light guide with indicated light beam path and FIG. 4 A magnified perspective view of a section for the coupling-in of light of the light guide according to the invention.

The section for the coupling-in of light 3 is embodied as a defocusing element, by means of which the light L1 being radiated from a light source 8 and entering the light guide 1 via a preferably spherical surface coupling the light in 9 is dispersed so that no luminance concentration occurs. As can be seen in FIG. 2, the light beams L1 are defocused by means of the defocusing element 3 or spatially expanded without the development of bright luminance maxima.

Figure 3:
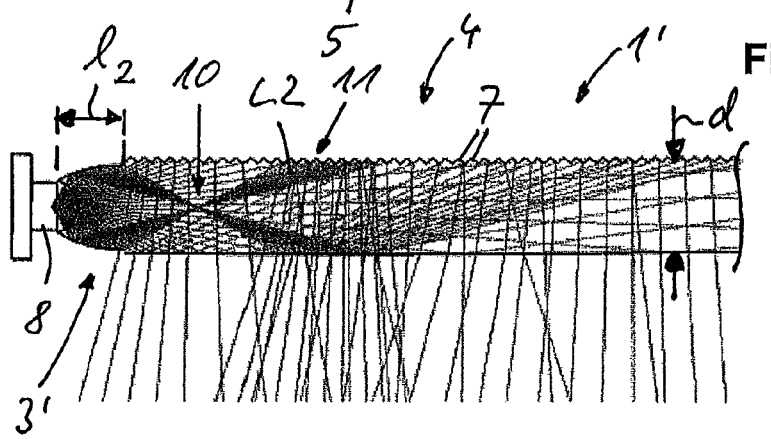

FIG. 3 shows a known light guide 1' having the same main section 4, but an ellipsoidal section for the coupling-in of light 3', as known from DE 199 24 411 A1. The focusing 10 of part of the coupled-in light beams L2 can be clearly recognized, which leads to areas of relatively high luminance 11 within the main section 4 of the light guide 1'. It is evident, that the known section for the coupling-in of light 3' has a length $l_2$ corresponding to a diameter d of the main section 4 of the light guide 1, 1'. The defocusing element according to the invention has a length $l_1$ which is larger than the diameter d of the main section 4 of the light guide 1. Preferentially, the length $l_1$ of the defocusing element 3 is at least twice as large as the diameter d of the main section 4.

The defocusing element 3 comprises a widened part 12 facing the light source 8 and a straight part 13 connecting to the former in the direction of the main section 4. The widened part 12 has a conical shape. The straight part 13 has a cylindrical shape, preferably with a diameter corresponding to that of the main section 4.

Figure 4:
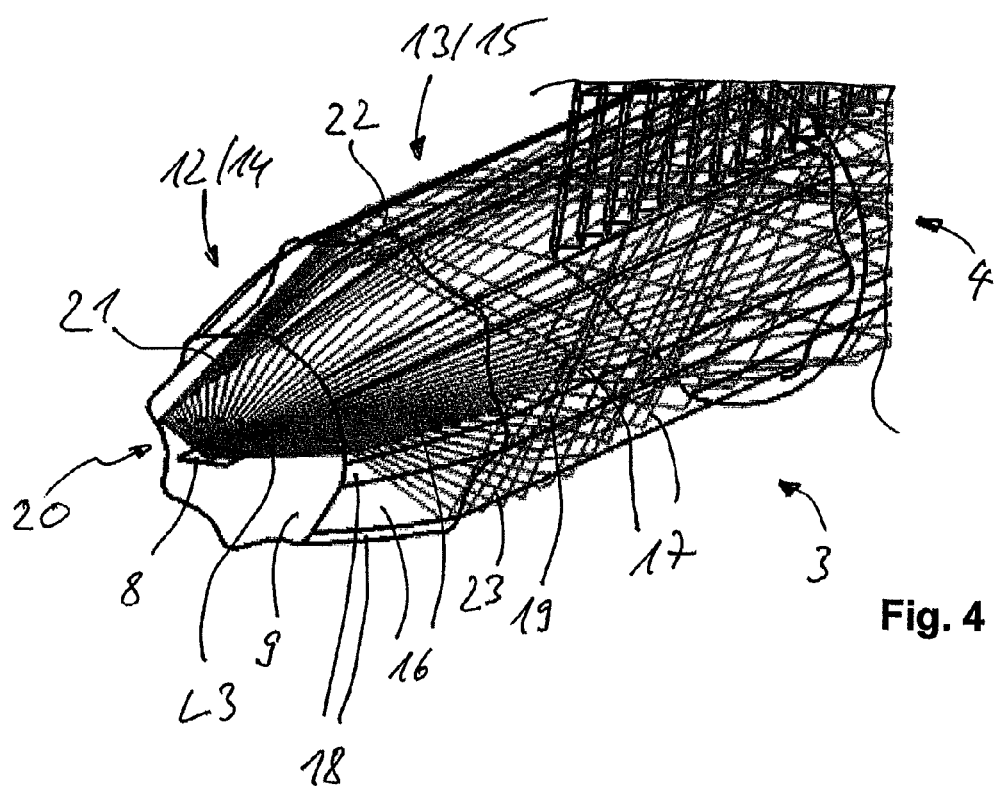

A can be seen in FIG. 4, the defocusing element 3, resp. the widened part 12 and the straight part 13 have defocusing outer surfaces 14 resp. 15 with convex sections 16 resp. 17 in the circumferential direction of the light guide 1. These adjoining convex sections 16, resp. 17 are connected by means of curved sections 18, resp. 19. The convex sections 16, 17 of the outer surfaces 14, 15 of the widened part 12 and the straight part 13 form a continuous trough shape in the longitudinal direction of the light guide 1, while the curved sections 18, 19 of the widened part 12 resp. the straight part 13 are running in the extension direction of the light guide 1 as a bead-shaped line. The defocusing outer surface 14, 15 of the widened part 12 resp. the straight part 13 do therefore have a continuous contour in the circumferential direction and in the longitudinal direction of the light guide 1.

The defocusing outer surfaces 14, 15 produce a further homogenization of the light L1 resp. reduction of the appearance of luminance concentrations. The defocusing outer surfaces 14, 15 achieve that the light beams L1 are even more separated and mixed inside the light guide 1. This is demonstrated in FIG. 4 by means of the beam path of a light beam L3 radiated in a plane 20 of the defocusing element 3. The plane 20 is limited by the line of intersection 21. In a customary section for the coupling-in of light 3' according to FIG. 3, the light beams would, after total reflection, remain on the faces of the ellipsoidal section for the coupling-in of light 3' on the plane 20. According to the defocusing element 3 according to the invention, the light beams L3 are reflected into various directions from the plane 20, so that a first partial light beam 22 is reflected toward a first side and a second partial light beam 23 is reflected toward a second side of the plane 20. This has a dispersing resp. defocusing effect on the light beams L3, which continues with each reflection on the defocusing outer surfaces 15 of the straight part 13. The appearance of luminance maxima can be reduced substantially, so that a homogeneous appearance of the light guide 1 is ensured.

According to an alternative embodiment, which is not represented, the defocusing outer surfaces 14, 15 can also have a concave shape.

In a preferred embodiment, the main section 4 is integrally connected with the section for the coupling-in of light 3. The light guide is preferably made from a transparent plastic material.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

1, 1' Light guide
2 First end
3, 3' Section for the coupling-in of light
4 Main section
5 Front side
6 Back
7 Element for coupling-out
8 Light source
9 Surface coupling the light in
10 Focussing—
11 Luminance section
12 Widened part
13 Straight part
14 Defocusing outer surface
15 Defocusing outer surface
16 Convex sections
17 Convex sections
18 Curved transitional section
19 Curved transitional section
20 Plane
21 Intersecting line
22 First partial light beam
23 Second partial light beam
L1, Light
L2,
L3
$l_1, l_2$ Length
d Diameter

The invention claimed is:

1. A light guide for vehicles, said light guide comprising:
a light coupling section for the coupling of light into one of a first end and a second end of the light guide;
a main section having a front side for the coupling out of light, said main section and front side extending between the first end and the second end of the light guide, and said main section also including a back extending between the first end and the second end of the light guide; and one or more elements for coupling out for the deflection of the coupled-in light toward the front side, characterized in that the section for the coupling-in of the light is a defocusing element extending between a surface coupling the light in and the main section.

2. The light guide according to claim 1, wherein the defocusing element has a widened part connecting to the surface coupling the light in, and a straight part extending between the widened part and the main section.

3. The light guide according to claim 1, wherein the defocusing element has defocusing outer surfaces.

4. The light guide according to claim 3, wherein the defocusing outer surfaces have a convex or a concave shape.

5. The light guide according to claim 1, wherein the light guide is rod-shaped, while the widened part of the defocusing element has a conical shape and the straight part of the defocusing element has a cylindrical shape.

6. The light guide according to claim 5, wherein the defocusing outer surface has a multitude of convex sections or concave sections in the circumferential direction.

7. The light guide according to claim 6, wherein the convex sections or concave sections are connected by means of curved transitional sections.

8. The light guide according to claim 6, wherein the convex sections or the concave sections extend continuously from the surface coupling the light in to the main section.

9. The light guide according to claim 3, wherein the defocusing outer surface has a continuous contour.

10. The light guide according to claim 1, wherein the surface coupling the light in has a spherical contour.

* * * * *